United States Patent
Rogers et al.

(10) Patent No.: US 8,285,427 B2
(45) Date of Patent: Oct. 9, 2012

(54) FLIGHT DECK COMMUNICATION AND DISPLAY SYSTEM

(75) Inventors: William Rogers, Minneapolis, MN (US); David Dwyer, Scottsdale, AZ (US); Anup Raje, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 654 days.

(21) Appl. No.: 12/183,750

(22) Filed: Jul. 31, 2008

(65) Prior Publication Data

US 2010/0030401 A1    Feb. 4, 2010

(51) Int. Cl.
    G01C 23/00    (2006.01)
    G05D 1/00     (2006.01)
    G05D 3/00     (2006.01)
    G06F 7/00     (2006.01)
    G06F 17/00    (2006.01)

(52) U.S. Cl. ............... 701/3; 340/945; 715/771

(58) Field of Classification Search ............ 701/3, 123, 701/202, 224, 484, 528; 340/945, 961–970; 715/771
    See application file for complete search history.

(56) References Cited

U.S. PATENT DOCUMENTS

| | | | |
|---|---|---|---|
| 5,111,400 A * | 5/1992 | Yoder ............................... | 701/3 |
| 5,842,142 A | 11/1998 | Murray et al. | |
| 5,978,715 A * | 11/1999 | Briffe et al. ....................... | 701/11 |
| 6,021,374 A * | 2/2000 | Wood .............................. | 701/301 |
| 6,038,498 A * | 3/2000 | Briffe et al. ........................ | 701/3 |
| 6,043,756 A | 3/2000 | Bateman et al. | |
| 6,043,757 A * | 3/2000 | Patrick ............................ | 340/963 |
| 6,062,513 A * | 5/2000 | Lambregts ....................... | 244/175 |
| 6,097,996 A * | 8/2000 | Deker .............................. | 701/10 |
| 6,112,141 A * | 8/2000 | Briffe et al. ....................... | 701/14 |
| 6,184,816 B1 | 2/2001 | Zheng et al. | |
| 6,199,008 B1 | 3/2001 | Aratow et al. | |

(Continued)

FOREIGN PATENT DOCUMENTS

WO    2005038748 A2    4/2005

OTHER PUBLICATIONS

Communication for EP 09166286.6 dated Feb. 23, 2010.

*Primary Examiner* — John Nguyen
*Assistant Examiner* — Michael Whalen
(74) *Attorney, Agent, or Firm* — Ingrassia Fisher & Lorenz, P.C.

(57) ABSTRACT

A flight deck communication and display system (100) for displaying a modified flight plan transmitted to an aircraft (224) is described including a processor (104) adapted to receive (i) data representative of a current aircraft flight plan (218, 228) and (ii) a textual message representative of the modified flight plan (218', 228') and operable, in response thereto, to supply a flight plan display command, and a modified flight plan display command, and comparing the textual clearance message with factors affecting aircraft safety to supply an alert message display command (204). A display (108) coupled to receive the flight plan display command, the modified flight plan display command, the alert message display command is operable, in response thereto, to substantially simultaneously display (308) (i) an image representative of the current aircraft flight plan, (ii) the textual clearance message, (iii) the modified flight plan, and (iv) an alert message indicating whether there are any safety concerns related to the textual air traffic modified flight plan.

12 Claims, 9 Drawing Sheets

U.S. PATENT DOCUMENTS

| | | | | |
|---|---|---|---|---|
| 6,289,277 | B1 | 9/2001 | Feyereisen et al. | |
| 6,321,158 | B1 | 11/2001 | DeLorme et al. | |
| 6,381,538 | B1* | 4/2002 | Robinson et al. | 701/211 |
| 6,389,355 | B1* | 5/2002 | Gibbs et al. | 701/206 |
| 6,449,556 | B1* | 9/2002 | Pauly | 701/206 |
| 6,512,975 | B2 | 1/2003 | Watson | |
| 6,552,669 | B2* | 4/2003 | Simon et al. | 340/945 |
| 6,643,580 | B1 | 11/2003 | Naimer et al. | |
| 6,778,906 | B1 | 8/2004 | Hennings et al. | |
| 6,816,780 | B2* | 11/2004 | Naimer et al. | 701/206 |
| 6,828,921 | B2 | 12/2004 | Brown et al. | |
| 6,828,922 | B1 | 12/2004 | Gremmert et al. | |
| 6,917,860 | B1* | 7/2005 | Robinson et al. | 701/3 |
| 6,922,631 | B1 | 7/2005 | Dwyer et al. | |
| 7,103,455 | B2 | 9/2006 | Subelet | |
| 7,177,731 | B2 | 2/2007 | Sandell et al. | |
| 7,363,119 | B2 | 4/2008 | Griffin, III et al. | |
| 7,463,955 | B1* | 12/2008 | Robinson et al. | 701/3 |
| 7,471,995 | B1* | 12/2008 | Robinson | 701/3 |
| 7,558,652 | B2* | 7/2009 | Astruc | 701/3 |
| 7,598,888 | B2* | 10/2009 | Matuska et al. | 340/945 |
| 7,603,209 | B2* | 10/2009 | Dwyer et al. | 701/14 |
| 7,734,411 | B2* | 6/2010 | Gremmert | 701/202 |
| 7,801,649 | B2* | 9/2010 | Gremmert | 701/9 |
| 7,904,213 | B2* | 3/2011 | Coulmeau | 701/3 |
| 7,912,594 | B2* | 3/2011 | Gremmert | 701/9 |
| 7,979,199 | B2* | 7/2011 | Judd et al. | 701/120 |
| 8,019,489 | B2* | 9/2011 | Harrison et al. | 701/3 |
| 2001/0023390 | A1 | 9/2001 | Gia | |
| 2002/0126040 | A1 | 9/2002 | Block | |
| 2003/0023354 | A1* | 1/2003 | Brust et al. | 701/3 |
| 2003/0156046 | A1* | 8/2003 | Dwyer et al. | 340/973 |
| 2004/0044445 | A1* | 3/2004 | Burdon | 701/3 |
| 2004/0068372 | A1 | 4/2004 | Ybarra et al. | |
| 2004/0111192 | A1* | 6/2004 | Naimer et al. | 701/9 |
| 2004/0239550 | A1* | 12/2004 | Daly, Jr. | 342/26 B |
| 2005/0049762 | A1 | 3/2005 | Dwyer | |
| 2005/0182528 | A1* | 8/2005 | Dwyer et al. | 701/3 |
| 2005/0192717 | A1 | 9/2005 | Tafs et al. | |
| 2005/0261808 | A1* | 11/2005 | Artini et al. | 701/3 |
| 2006/0069468 | A1* | 3/2006 | Astruc | 701/3 |
| 2006/0241820 | A1* | 10/2006 | Dwyer et al. | 701/3 |
| 2006/0247828 | A1* | 11/2006 | Ardila et al. | 701/3 |
| 2007/0050101 | A1* | 3/2007 | Sacle et al. | 701/11 |
| 2007/0067093 | A1* | 3/2007 | Pepitone | 701/120 |
| 2007/0208465 | A1 | 9/2007 | Gremmert | |
| 2007/0219678 | A1 | 9/2007 | Coulmeau | |
| 2008/0114504 | A1 | 5/2008 | Goodman et al. | |
| 2008/0154486 | A1* | 6/2008 | Coulmeau | 701/120 |
| 2008/0167885 | A1* | 7/2008 | Judd et al. | 705/1 |
| 2008/0300737 | A1* | 12/2008 | Sacle et al. | 701/3 |
| 2009/0125222 | A1* | 5/2009 | McCullough et al. | 701/120 |
| 2009/0248224 | A1* | 10/2009 | Tschannen | 701/3 |
| 2009/0312893 | A1* | 12/2009 | Dwyer et al. | 701/120 |
| 2009/0319100 | A1* | 12/2009 | Kale et al. | 701/4 |
| 2009/0319103 | A1* | 12/2009 | Dwyer et al. | 701/14 |
| 2009/0319944 | A1* | 12/2009 | Chikkegowda et al. | 715/804 |
| 2010/0030401 | A1* | 2/2010 | Rogers et al. | 701/3 |
| 2010/0114633 | A1* | 5/2010 | Sislak et al. | 705/7 |
| 2010/0131126 | A1* | 5/2010 | He et al. | 701/14 |
| 2010/0194602 | A1* | 8/2010 | Engels et al. | 340/979 |
| 2010/0241292 | A1* | 9/2010 | Gremmert | 701/3 |
| 2010/0250026 | A1* | 9/2010 | Deker et al. | 701/3 |
| 2010/0250032 | A1* | 9/2010 | Gremmert | 701/9 |
| 2011/0208374 | A1* | 8/2011 | Jayathirtha et al. | 701/5 |
| 2011/0208415 | A1* | 8/2011 | Mere et al. | 701/123 |

* cited by examiner

FLIGHT DECK COMMUNICATION AND DISPLAY SYSTEM

TECHNICAL FIELD

The present invention generally relates to aircraft flight management system displays and, more particularly, to a flight management system display that integrates an existing graphical flight path display with graphic and textual display of air traffic control or pilot requested flight plan changes, and provides a warning of the possible inability to comply therewith, or a notification of the potential negative impacts in complying, for example, due to environmental or avionic factors.

BACKGROUND

Presently, most air traffic control systems around the world utilize voice communications to transmit various messages between air traffic controllers and pilots. The messages that are transmitted between air traffic controllers and pilots include, among other things, air traffic control clearances, various advisories, and aviation weather service, which help ensure coordination of aircraft movement, and appropriate aircraft separation. As air travel has increased over the years, controller-pilot communication has concomitantly increased to the point that the voice communication channels have, at many locations, become saturated during peak aircraft traffic periods. Moreover, at the frequencies generally used for air traffic control voice communications, the communications are limited to line-of-sight. Thus, once an aircraft is no longer within a line-of-sight path with an air traffic control center, voice communication is no longer available.

To reduce the amount of controller-pilot voice communication that presently occurs, and to alleviate the reliance on the concomitant line-of-sight communications, a new data communication system has been developed that relies on data communication of certain controller-pilot communications. With this new communication system, some routine controller-pilot communications that are presently transmitted over a voice communications channel can be transmitted over a data communications channel, thus freeing up the voice communications channel for the less routine messages. For example, the data communication system allows various textual aircraft clearance messages to be transmitted and received, to and from, an aircraft over a data channel. These textual messages are presently processed and displayed via a separate, dedicated message display system.

Although the present controller-pilot data communication system implementation is generally reliable, safe, and reduces the communication load over the voice communication channels, it does suffer certain drawbacks. For example, the textual messages that are transmitted to and from an aircraft are standardized, thus pilot initiated textual messages are presently created using a "cut-and-paste" implementation, in which the pilot selects one or more standard portions of text from a list and places it in the message. This operation can be cumbersome, time-consuming, and can distract from the pilot's main tasks. Moreover, because the system is implemented separate from the aircraft flight management system, if a clearance message transmitted to the aircraft instructs the pilot to modify the aircraft's current flight plan, once the pilot acknowledges the message, the flight plan is updated, either automatically or by the pilot, in the aircraft flight management system. Again, this added operation can be cumbersome, time-consuming, and a distraction to the pilot. Moreover, because the messages are displayed on a separate display, the pilot's attention may be diverted away from the main flight deck display(s).

When Air Traffic Control sends clearance messages to an aircraft, the pilots currently need to interpret how the clearance impacts their current flight path in order to determine whether they can comply with the clearance. They also have to visualize what the new flight path or trajectory will look like. Therefore, pilots are susceptible to safety-impacting misinterpretations, unanticipated A/C inabilities to achieve the clearance, and other types of mental transformation errors. Even with the updated clearance displayed on another display, the pilots must consider whether this new clearance is safe considering environmental and avionic factors.

Hence, there is a need for a system and method that addresses one or more of the above-noted drawbacks. Namely, a system and method for transmitting, receiving, initiating, and displaying textual air traffic control clearance messages that is less cumbersome, less time-consuming, and less distractive to a pilot, and/or alleviates the need for a pilot to separately update the aircraft flight plan using the flight management system when the textual clearance message requests such a modification, while providing notification of 1) a safety alert when the clearance message puts the aircraft at risk, e.g., due to terrain, traffic, and weather, 2) an inability to comply alert due to constraints of aircraft performance based on, e.g., current position, altitude, heading, speed, vertical speed, and available thrust, and 3) a negative impact alert due to the affect of the clearance on aircraft efficiency, e.g., time, fuel consumption, and noise and emission environmental concerns. The present invention addresses one or more of these needs. Furthermore, other desirable features and characteristics of the present invention will become apparent from the subsequent detailed description and the appended claims, taken in conjunction with the accompanying drawings and the foregoing technical field and background.

BRIEF SUMMARY

A flight deck communication and display system for displaying an air traffic control clearance transmitted to an aircraft is described including a processor adapted to receive (i) data representative of a current aircraft flight plan and (ii) a textual clearance message signal representative of the air traffic control requested modification to the flight plan and operable, in response thereto, to supply a flight plan display command, and a modified flight plan display command, and comparing the textual clearance message signals with factors affecting aircraft safety, ability to comply, efficiency, and environmental impacts to supply an alert message display command. A display coupled to receive the flight plan display command, the modified flight plan display command, the alert message display command is operable, in response thereto, to substantially simultaneously display (i) an image representative of the current aircraft flight plan, (ii) the textual clearance message, (iii) an image representative of the modified flight plan, and (iv) an alert message indicating whether there are any safety, ability to comply, efficiency, or environmental concerns related to the requested air traffic modification to the flight plan.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

An apparatus and method is described that processes a current flight plan and a received ATC clearance message of a modified flight plan, determines whether the modified flight plan will encounter any known obstacles or exceed any aircraft flight specifications, and displays on the same display the current flight plan, the ATC clearance message, the modified flight plan, and a message indicating whether the modified flight plan is acceptable or unacceptable due to the obstacles or aircraft flight specifications. The message indicating whether the modified flight plan is acceptable may be displayed as a text message, a graphic symbol or icon (which may be in color or flashing), may be presented as an aural alert including spoken words, or a combination of thereof. The obstacles may include, for example, natural obstacles such as terrain and weather, or artificial obstacles such as a restricted area. The aircraft flight specifications may include, for example, altitude and speed.

Figure 1:
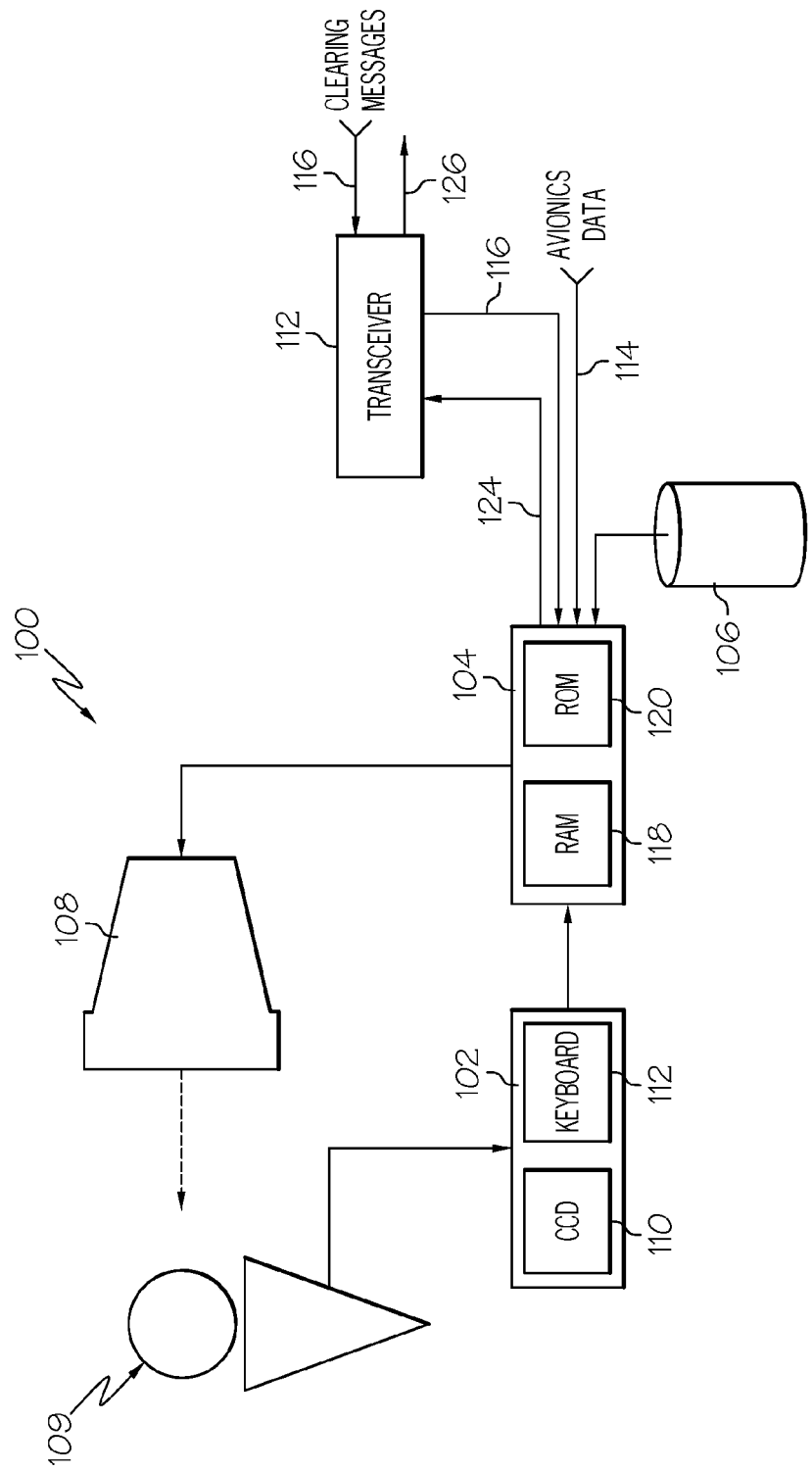
FIG. 1 is a functional block diagram of a known exemplary flight management system.

Referring to FIG. 1, an exemplary flight management system (FMS) 100 includes a user interface 102, a processor 104, one or more navigation databases 106, and a display 108. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 110, such as a mouse, a trackball, or joystick, and/or a keyboard, one or more buttons, switches, or knobs. In the depicted embodiment, the user interface 102 includes a CCD 110 and a keyboard 112. As will be described more fully below, the user 109 uses the CCD 110 to, among other things, move a cursor symbol 201 on the display screen (see FIG. 2), and may use the keyboard 112 to, among other things, input textual data for subsequent transmission to air traffic control centers.

The processor 104, as was just noted, is in operable communication with, and receives user input commands from, the user interface 102. The processor 104 is additionally in operable communication with the navigation databases 106, and with the display 108, and is coupled to receive various types of avionics data 114 from various remote systems and/or sensors (not illustrated), and to receive signals 116 representative of air traffic control clearance messages. The processor 104 receives the user input commands supplied from the user interface 102 and is configured, in response to these user input commands, to selectively retrieve data from one or more of the navigation databases 106 and supply appropriate display commands to the display 108, so that the retrieved data is appropriately displayed on the display 108. The processor 104 is additionally configured to supply appropriate display commands to the display 108 so that the avionics data 114 may be selectively displayed on the display 108.

The processor 104 may be any one of numerous known general purpose microprocessors or an application specific processor that operates in response to program instructions. In the depicted embodiment, the processor 104 includes on-board RAM (random access memory) 118, and on-board ROM (read only memory) 120. The program instructions that control the processor 104 may be stored in either or both the RAM 118 and the ROM 120. For example, the operating system software may be stored in the ROM 120, whereas various operating mode software routines and various operational parameters may be stored in the RAM 118. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The navigation databases 106 include various types of navigation-related data. Such navigation-related data includes various flight plan related data such as, for example, waypoints, distances between waypoints, headings between waypoints, data related to different airports, navigational aids, obstructions (terrain, towers, etc.), special use airspace, political boundaries, communication frequencies, and aircraft approach information. It will be appreciated that, although the navigation database 106 is, for clarity and convenience, shown as being stored separate from the processor 104, the database 106 could be loaded into the on-board RAM 118, or the database 106 could be integrally formed as part of the processor 104, and/or RAM 118, and/or ROM 120. The navigation database 106 could also be part of a device or system that is physically separate from the display system 100. The avionics data 114 that is supplied from remote systems and/or sensors includes data representative of the state of an aircraft such as, for example, aircraft speed, altitude, and heading. The transceiver may also receive data including the location of weather such as rain, thunderstorms, icing conditions, and turbulence, and the position of traffic (nearby aircraft), which may be presented on the display 108.

The air traffic control signals 116 are transmitted to an aircraft via, for example, modulated radio frequency (RF) signals. The air traffic control signals 116 are received and demodulated by a transceiver 122, and are then supplied to the processor 104. The air traffic control signals 116 each include data representative of one or more air traffic control clearance messages. Thus, the processor 104 further processes the signals 116 and supplies one or more display commands to the display 108, such that the clearance messages are displayed in both a textual format and a graphical format. As will be described more fully below, the processor 104 also supplies air traffic control response signals 124 to the transceiver 122, which in turn modulates the response signals 124 and transmits the modulated response signals 126 to an air traffic control station (not shown). In the depicted embodiment, the transceiver 122 is separate from the processor 104. However, it will be appreciated that the transceiver 122 could be implemented as part of the processor 104.

The display 108 is used to display various images and data, in both a graphical and a textual format, and to supply visual feedback to the user 109 in response to the user input commands supplied by the user 109 to the user interface 102. It will be appreciated that the display 108 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. To provide a more complete description of the method that is implemented by the flight management system 100, a general description of the display 108 and its layout will now be provided.

Figure 2:
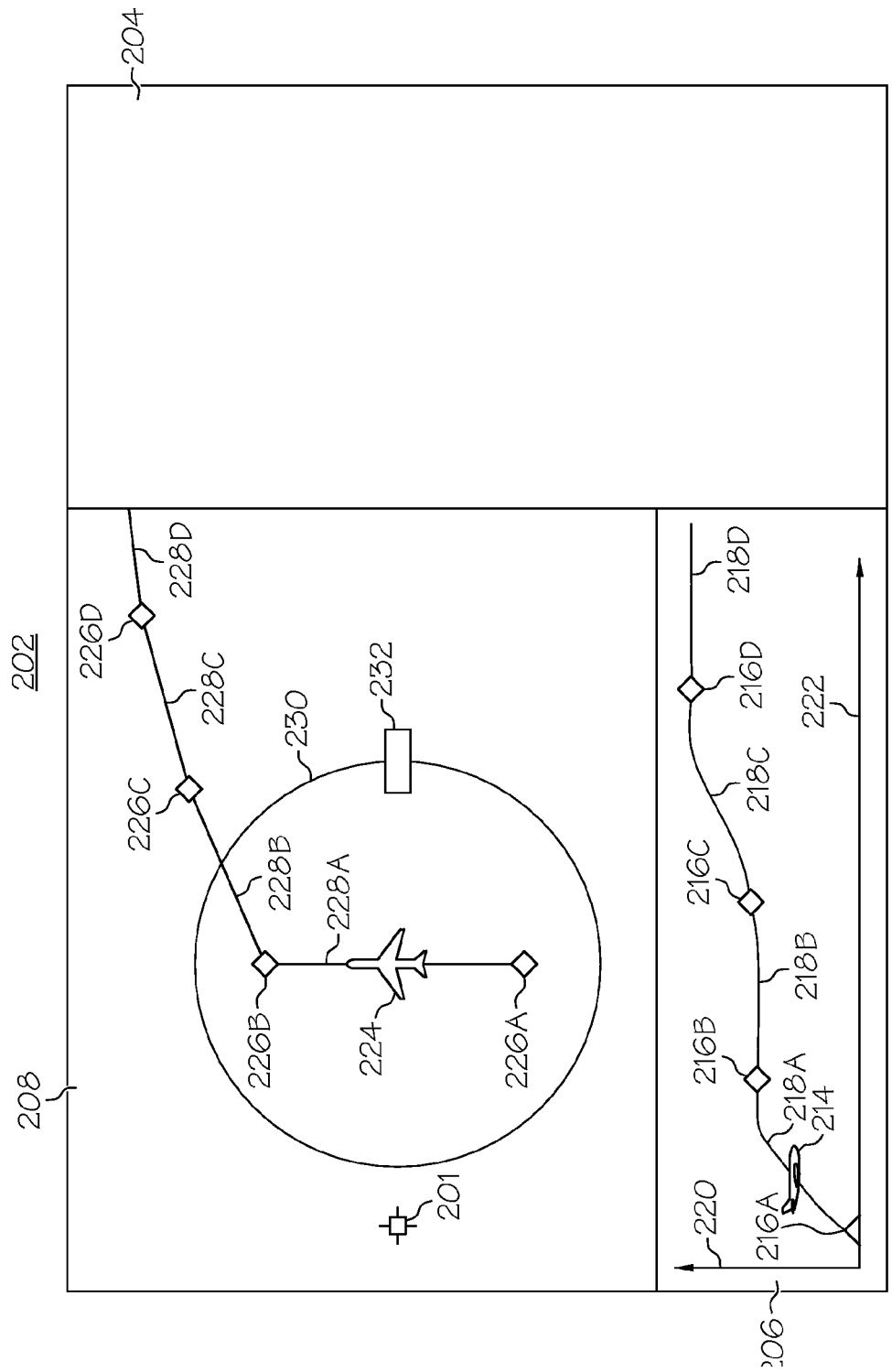
FIG. 2 is a simplified representation of a known exemplary display screen that may be used in the system of FIG. 1, which shows the overall layout of the display screen, and on which is various graphical and textual images are simultaneously displayed.

With reference to FIG. 2, it seen that the display 108 includes a display area 202 in which multiple graphical and textual images may be simultaneously displayed. For example, general flight-related data 204, a vertical profile 206, and a lateral map 208 may be displayed simultaneously, alone, or in various combinations. The general flight-related data 204 that is displayed may include various types of data related to the flight plan of the aircraft. Such data includes, but is not limited to, the flight identifier, route iteration number, a waypoint list and associated information, such as bearing and time to arrive, just to name a few. It will be appreciated that the general flight-related data 204 may additionally include various types of data associated with various types of flight hazards. Examples of these, and other types of data that may be displayed, are disclosed in U.S. Pat. No. 6,289,277, entitled "Interfaces for Planning Vehicle Routes," which is assigned to the assignee of the present application, and the entirety of which is hereby incorporated by reference.

The vertical profile 206 includes a side-view aircraft symbol 214, one or more waypoint symbols 216A-D, line segments 218A-D that interconnects the waypoint symbols 216, a vertical axis 220, and a horizontal axis 222. The waypoint symbols 216 and interconnecting line segments 218 correspond to the current flight path and flight plan of the aircraft. The vertical axis 220 represents aircraft altitude and is suitably graduated with altitude values (not shown), and the horizontal axis 222 represents aircraft lateral position and is suitably graduated with lateral distance values (not shown). It will be appreciated that the horizontal axis 222 could alternatively be graduated with time values in addition to, or instead of, lateral distance values.

The lateral map 208 includes a top-view aircraft symbol 224, one or more waypoint symbols 226A-D, line segments 228A-D that interconnect the waypoint symbols 226, and one or more range rings 230. The lateral map 208 also preferably includes various map features including, but not limited to, terrain, political boundaries, and navigation aids, which, for clarity, are not shown in FIG. 2. The range rings 230, only one of which is shown in FIG. 2, indicate nautical distance from the top-view aircraft symbol 224. In the illustrated embodiment, the range ring 230 includes a range indicator 232, which displays the lateral distance from the aircraft's present position to the position on the lateral map 202 that corresponds to the range ring 230 (e.g., 200 nautical miles). It will be appreciated that the value of the range indicator 232 may be set manually or automatically, via a non-illustrated a pop-up menu.

Having described a particular embodiment of the system 100, and the general layout of the display area 202, from a structural standpoint, and having generally described the overall functionality of the system 100, a more detailed description of a process implemented by the system 100 to simultaneously display flight management data and textual air clearance messages, and alert (warning) messages on the same display 108 will be provided. In doing so, reference should be made, as appropriate, to FIGS. 1, 2, and 4-9, in combination with FIG. 3, which illustrates an exemplary process implemented by the system 100. It should be noted that the parenthetical reference numerals in the following description correspond to like reference numerals that are used to reference the flowchart blocks in FIG. 3. Moreover, for clarity and ease of explanation, the system 100 is shown in FIGS. 4-9 in a configuration in which only the lateral map 208 and, when appropriate, the textual clearance message 210 and user interface field 212 are simultaneously displayed in the display area 202.

Figure 4:
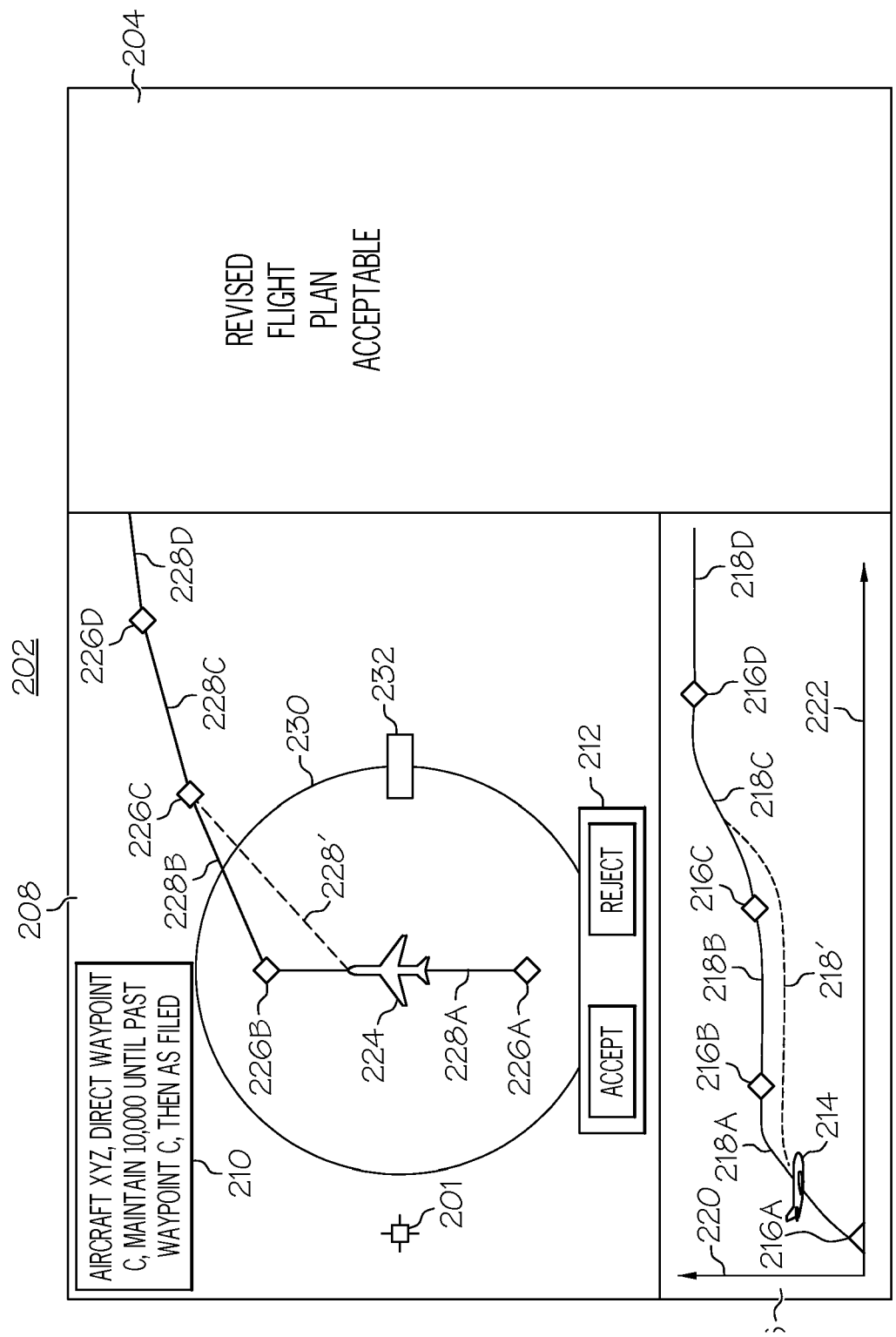
FIGS. 4-9 are each a simplified representation of an exemplary display screen that may be used in the system of FIG. 1 in accordance with exemplary embodiments.

Turning first to FIG. 4 and in accordance with a first exemplary embodiment, the lateral map 208 for the current aircraft flight plan is displayed in the display area 202 (302). As shown, the aircraft has taken off from Waypoint A (226A), is proceeding to Waypoint B (226B), then to Waypoint C (226C), and then onto various other Waypoints D (226D), and so forth, in accordance with the current flight plan as-filed. The lateral map 208 for the current flight plan will remain displayed until the processor 104 receives an air traffic clearance message signal 116 (304) as a revised flight plan. Thereafter, as shown in FIG. 5, the transceiver 122 demodulates the air traffic clearance message signal 116, the processor 104 processes the demodulated signal, and supplies appropriate display commands to the display 108, which in turn displays the textual clearance message 210 and the user interface field 212 (306).

The textual air traffic control messages 210 that are displayed in the display area 202 correspond to the above-mentioned air traffic control signals 116 that are received and demodulated by the transceiver 122, and processed by the processor 104. The user interface field 212, as will be described more fully below, is displayed whenever a textual air traffic control signal 116 is received and processed by the processor 104, and the corresponding textual air traffic control message 210 is displayed. Preferably, the textual messages 210 and user interface field 212 are automatically displayed each time a textual air traffic control signal 116 is received and processed by the processor 104. Moreover, the message 210 and user interface field 212 both preferably remain displayed until the processor 104 receives an appropriate response via the user interface field 212, preferably in the form of a user command signal supplied from the user interface 102. Once an appropriate response to the displayed message 210 is received, the message 210 and user interface field 212 are preferably no longer displayed in the display area 202. In a particular preferred embodiment, the message 210 and user interface field 212 are both simultaneously displayed on the lateral map 208. It will be appreciated that this is merely exemplary of a particular preferred embodiment, and that either, or both, could be displayed with the other graphical and textual images described above.

The processor 104 also determines whether the received air traffic clearance message signal 116 indicates a modification to the current flight plan (308). If the message signal 116 does indicate such a modification, then the modification is graphically displayed on the lateral map 208 with the current flight plan (310). For example, as shown in FIG. 5, the textual clearance message indicates that the aircraft (e.g., "Aircraft 123") should fly directly to Waypoint C, maintain 10,000 feet until past Waypoint C, and then consistent with the flight plan as-filed. Thus, the processor 104 supplies display commands to the display 108 so that an updated line segment 216', that connects Waypoint A (226A) to Waypoint C (226C), is also displayed on the lateral map 208 and the vertical profile 206.

Figure 3:
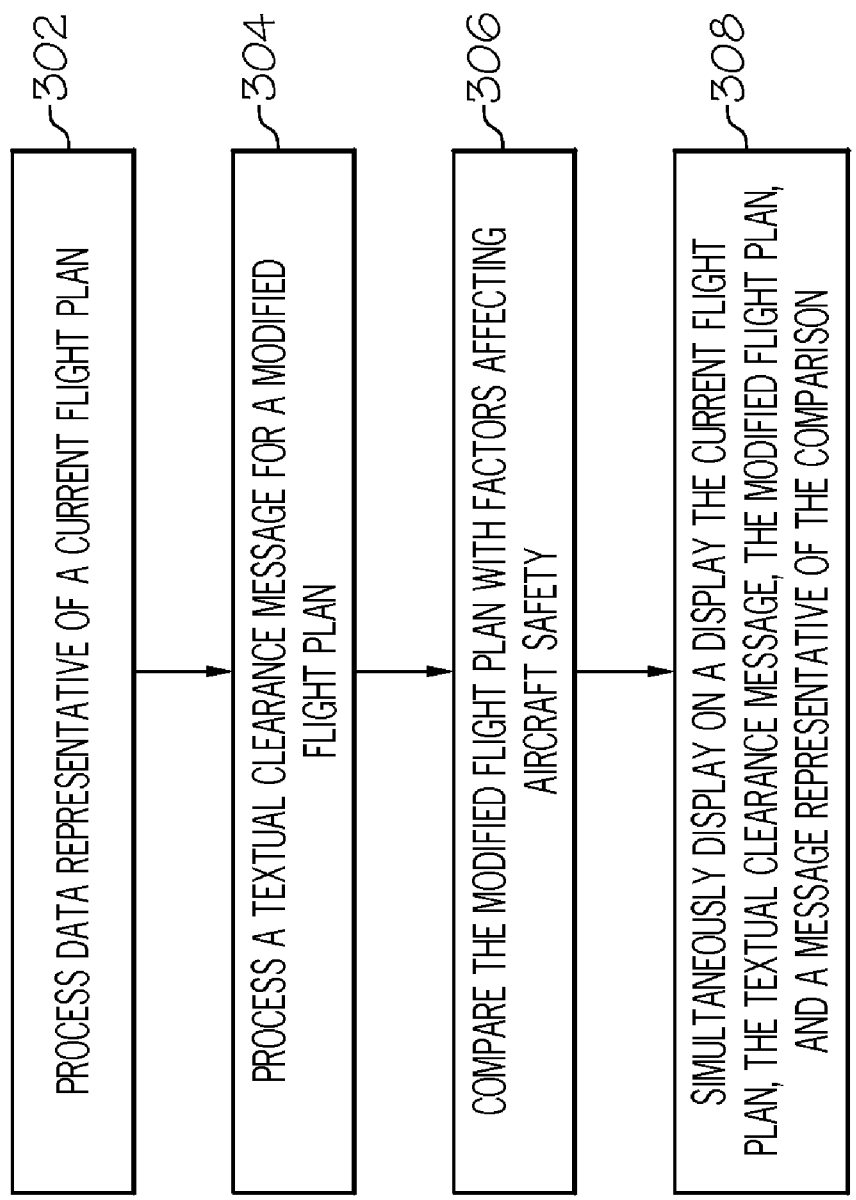
FIG. 3 is a flowchart that depicts an exemplary embodiment of the process implemented by the system of FIG. 1 to display the graphical and textual images that are displayed on the display screens of FIG. 4-9.
Figure 5:
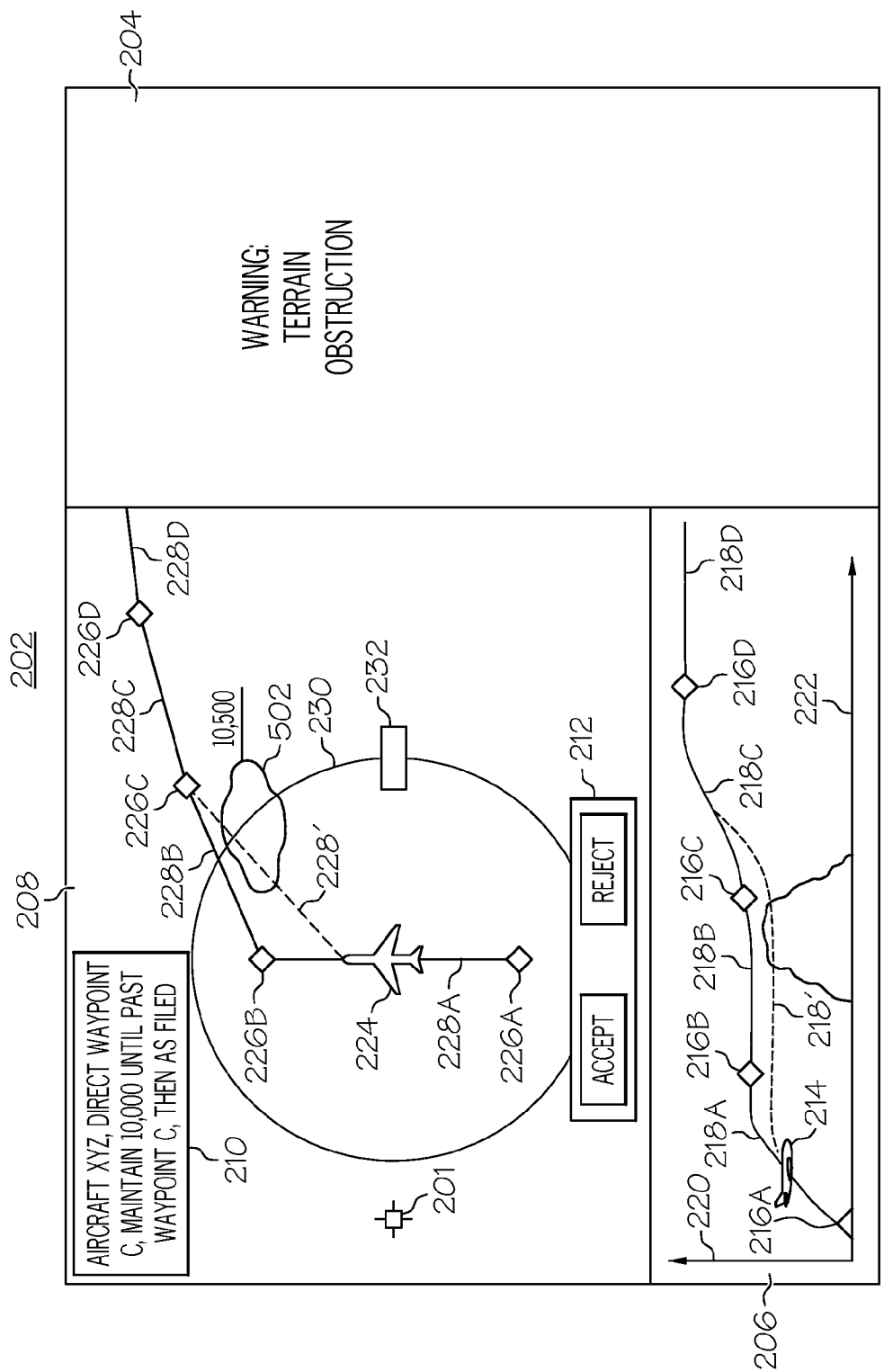

Though not depicted in FIG. 5, but as shown in FIG. 3, in a particular preferred embodiment, the flight-related data 204 associated with the updated modified flight plan is also displayed in the display area 202. This allows the pilot 109 to see how various parameters such as, for example, time and fuel consumption, would be effected by the flight plan modification before accepting or rejecting the modification.

The processor 104 compares the modified flight plan with data stored in the RAM 118 or ROM 120 to determine whether the aircraft 224 in following the modified flight plan will confront any obstacles or aircraft limitations. If not, a message such as REVISED FLIGHT PLAN ACCEPTABLE will appear as flight related data 204 as shown in FIG. 4. If the modified flight plan approaches or infringes on airspace occupied by an obstacle or if an aircraft limitation is exceeded, an alert or warning message will appear as flight related data 204. FIGS. 5-9 illustrate exemplary embodiments of such unacceptable modified flight plans. In each of these exemplary embodiments, while the alert or warning message is displayed as text, it should be understood that in the message may be displayed as a graphic symbol or icon (which may be in color or flashing), may be presented as an aural alert including spoken words, or a combination thereof including text.

FIG. 5 shows terrain 502 that has an elevation of 10,500 feet in the lateral display 208 and in the vertical display 206 which blocks the modified flight path 228'. The processor 104 determines this conflict and provides a message such as WARNING: TERRAIN OBSTRUCTION as flight related data 204.

Figure 6:
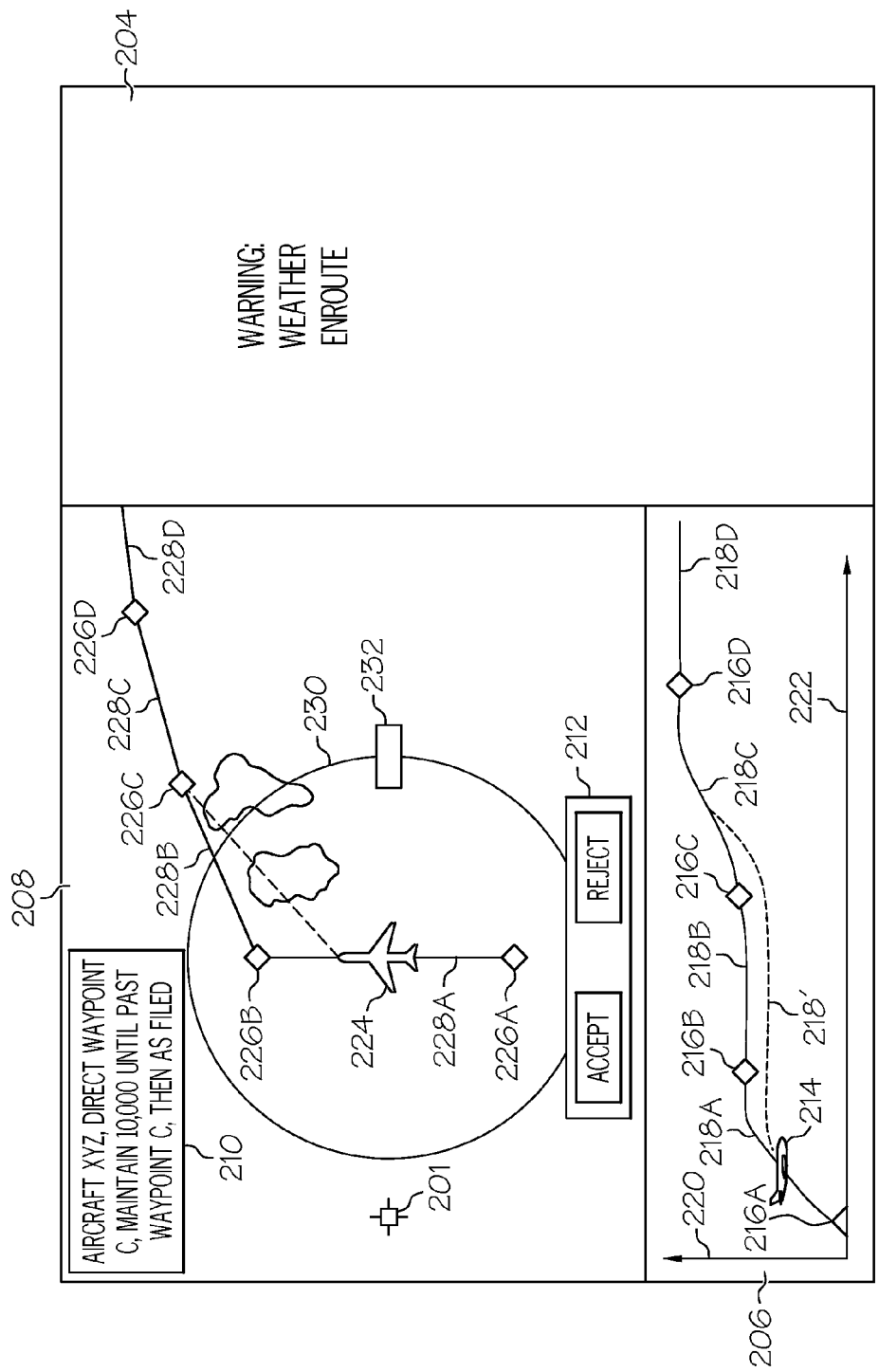

FIG. 6 shows weather 602 in the lateral display 208 and the vertical display 206 which is in the modified flight path 228'. The processor 104 determines this hazard and provides a message such as WARNING: WEATHER ENROUTE as flight related data 204. The weather could be, for example, heavy rain or a thunderstorm. The message presented could be specific as to the type of weather, for example, WARNING: REPORTED ICING.

Figure 7:
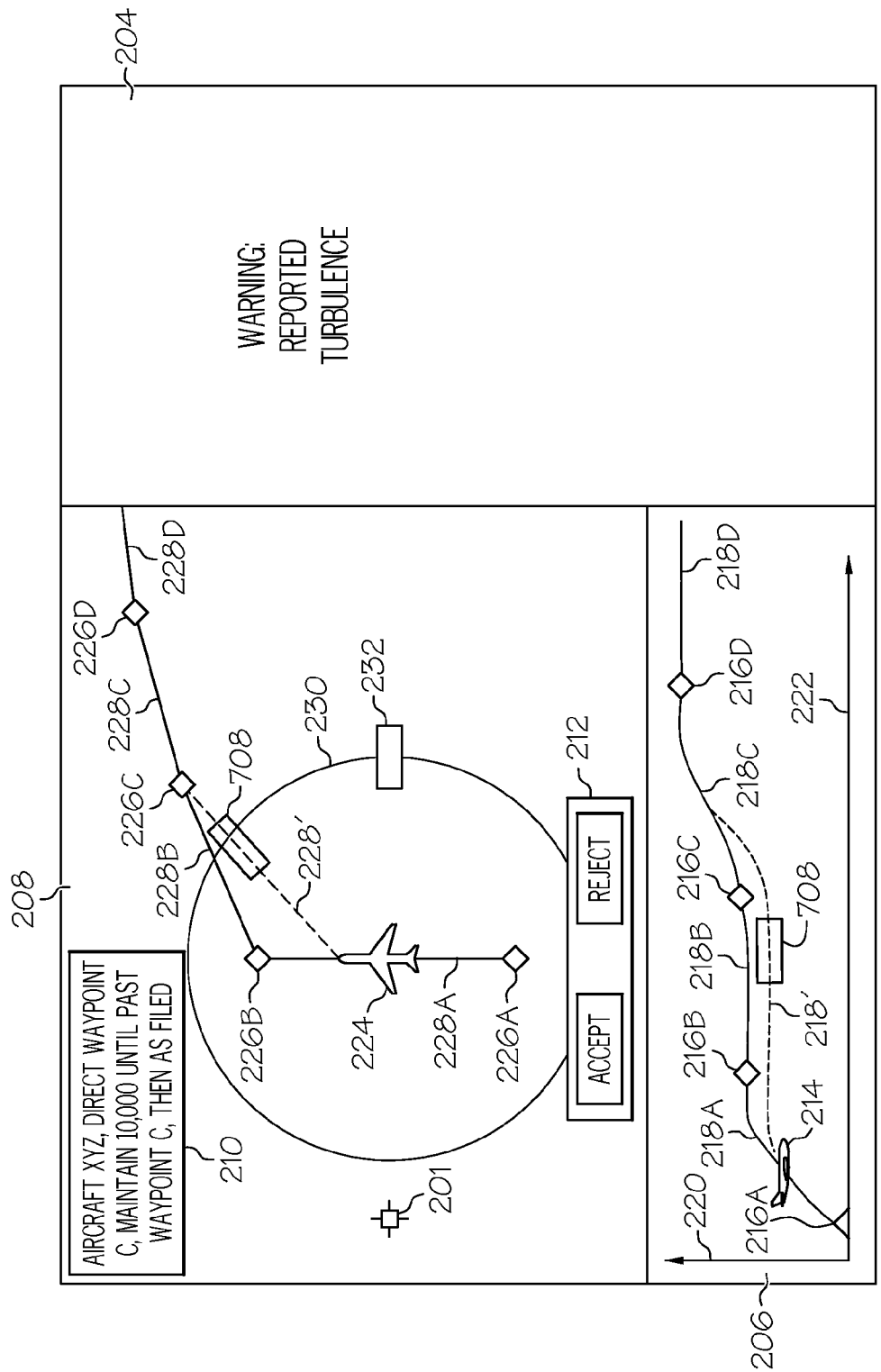

FIG. 7 illustrates an exemplary embodiment wherein weather related phenomena 708, such as turbulence or icing, has been reported by pilots of other aircraft. The processor 104 may cause the phenomena 708 to be shown on both the lateral display 208 and the vertical display 206 and a message to be displayed such as WARNING: REPORTED TURBULANCE as flight related data 204.

Figure 8:
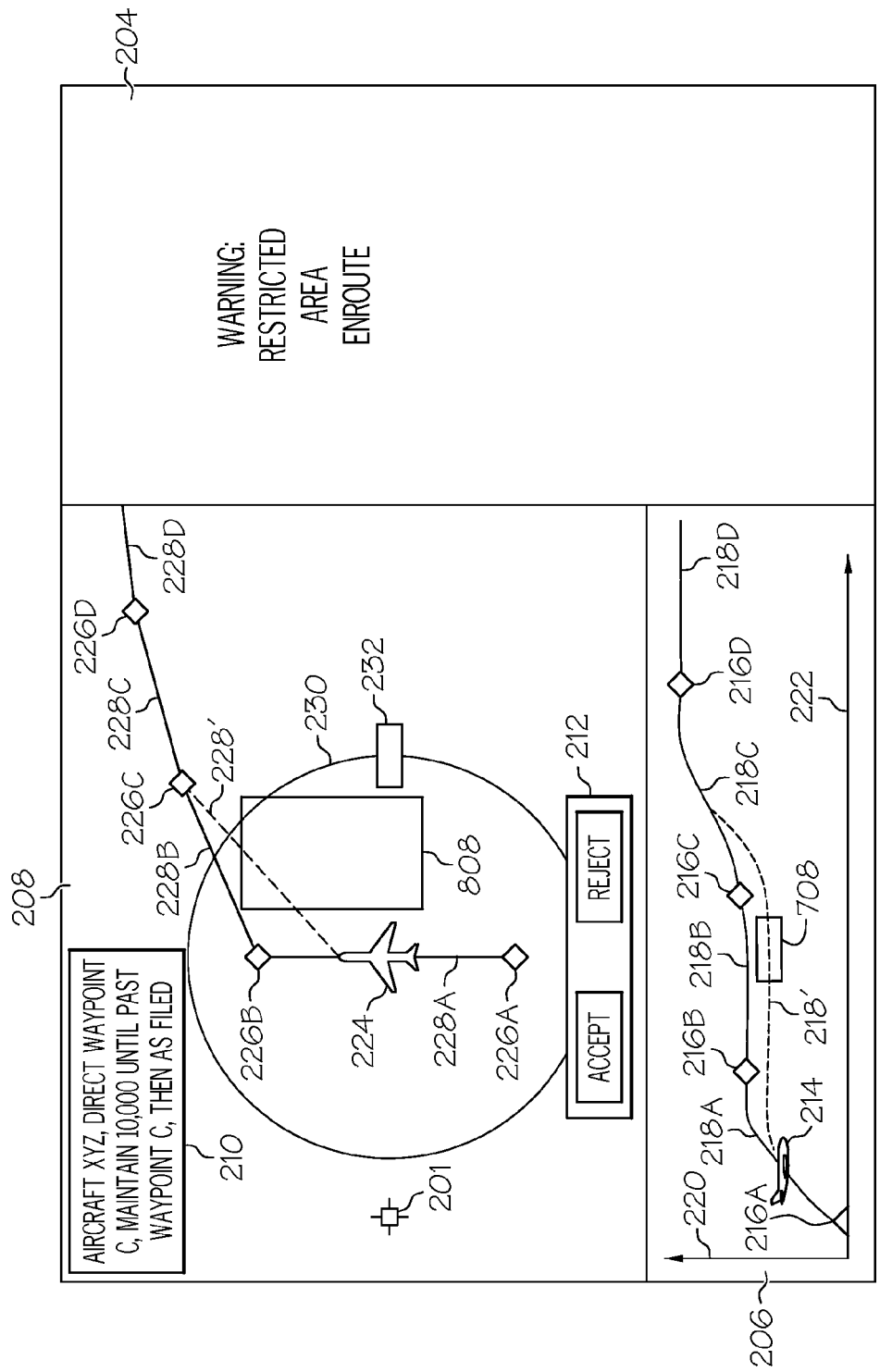

FIG. 8 shows a restricted area 808 on the lateral display 208. Examples of restricted areas include military use and airport airspace. Note that it is not displayed in the vertical display 206. The processor 104 determines the conflict between the restricted area 708 and the modified flight path 228' and presents a message such as WARNING: RESTRICTED AREA ENROUTE as flight related data 204. Information regarding the restricted area could also be presented as flight related data 204.

Figure 9:
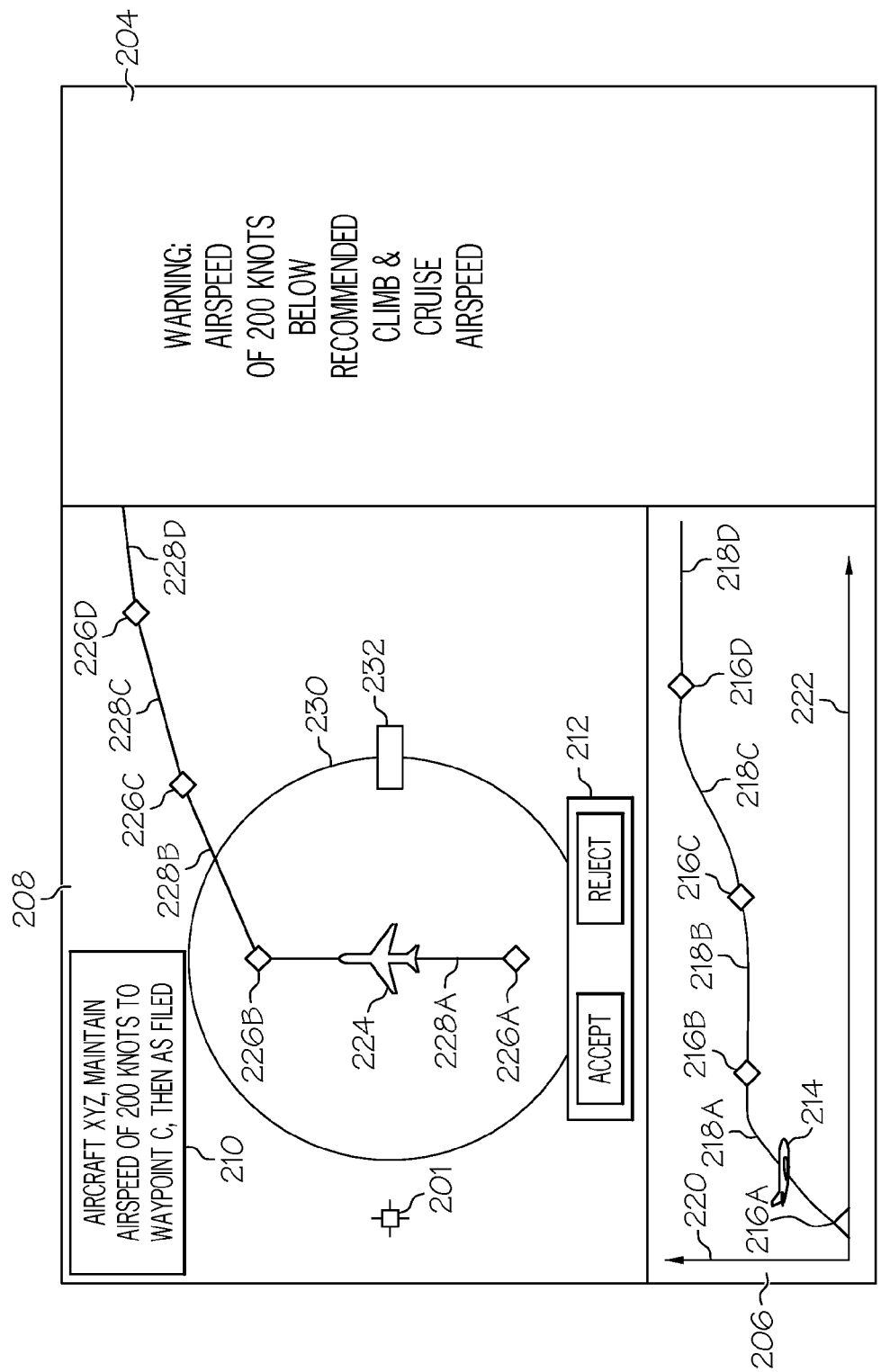

FIG. 9 illustrates an example wherein the modified flight plan requires an aircraft performance that approaches or exceeds aircraft specifications. For example, the ATC message read AIRCRAFT XYZ, MAINTAIN AIRSPEED OF 200 KNOTS TO WAYPOINT C, THEN AS FILED. The processor 104 compares these instructions with aircraft data stored in the ROM 120, determines the airspeed of 200 knots is marginally within safety limits, and provides the message WARNING: AIRSPEED OF 200 KNOTS BELOW RECOMMENDED CLIMB AND CRUISE AIRSPEED or WARNING: AIRSPEED OF 200 KNOTS BELOW SAME CLIMB AND CRUISE AIRSPEED as flight related data 204.

In each of the exemplary embodiments described above with reference to FIGS. 4-9, the processor 104 will continue supplying display commands to the display 108, such that the current and modified flight plans, the textual clearance message 210, and the user interface field 212 are simultaneously displayed, until the user 109 appropriately responds to the textual clearance message 210 (312). Once the appropriate response is provided, the processor 104 supplies an air traffic control response signal 124 to the transceiver 122, which in turn modulates the response signal 124 and transmits the signal to the air traffic control station that sent the originating message (314). The processor 104 also updates the flight plan, if accepted, consistent with the user response (316). For example, in the depicted embodiments, the user 109, using the user interface 102, places the cursor symbol 201 over the "Accept" or "Reject" button in the user interface field 212 and, once again, using the user interface 102, selects this as the response to the clearance message 210, thus accepting or rejecting the modification to the as-filed flight plan. If accepted, the flight plan is graphically updated on the lateral map 208. Though not depicted, it will additionally be appreciated that the flight-related data 204, and vertical profile 206 (if necessary) are also updated to reflect the new flight plan.

In addition to responding to textual clearance messages transmitted to the aircraft, it will be appreciated that the system 100 may be configured to allow the pilot 109 to transmit textual messages from the aircraft to, for example, an air traffic control center. In one embodiment, the pilot 109 may compose a message using the user interface keyboard 112. The message, while it is being composed, is displayed as a textual clearance message 210 in the display area 202. Then, when the pilot 109 is ready to send the message, he or she may transmit the message 210 by selecting the "Accept" button in the user interface field 212. Alternatively, when the pilot 109 is composing a textual message 210, the system 100 could be configured such that the user interface field 212 displays a "Transmit" button, rather than the "Accept" button. In either case, when the message 210 is transmitted, the processor 104 transmits the textual message data to the transceiver 122, which modulates the textual message data for transmission to the air traffic control center.

It will be appreciated that the use of the keyboard 112 to compose a pilot-initiated textual message 210 is merely exemplary of one particular embodiment, and that the system 100 could be configured to allow the pilot 109 to compose messages using other means of implementation. For example, the system 100 could be configured to allow the pilot 109 to select predetermined phrases or words from, for example, a static or drop-down menu, using the CCD 110. The words or phrases are preferably consistent with air traffic control syntax such, and may be, for example, cockpit control language such as disclosed in U.S. Pat. No. 5,844,503, entitled "Method and Apparatus for Avionics Management," which is assigned to the assignee of the present application, the entirety of which is hereby incorporated by reference.

In addition to automatically updating a current flight plan in response to a clearance message, the system 100 is also preferably configured to generate and transmit a textual message in response to the pilot 109 graphically updating the flight plan. For example, with reference once again to FIGS. 4-7, if the pilot 109, using the user interface 102, graphically modified the flight plan so that the aircraft would fly directly from Waypoint A (226A) to Waypoint C (226C), then the processor 104 would automatically generate the textual clearance message 210. Upon acceptance by the pilot 109, the processor 104 would transmit the data to the transceiver 122, which would modulate and transmit the message 210 to the appropriate air traffic control center.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A flight deck communication and display system for displaying a modified flight plan, the system comprising:
   a processor on board the aircraft configured to receive (i) data representative of a current aircraft flight plan and (ii) a textual air traffic clearance message representative of the modified flight plan and configured, in response thereto, to supply a flight plan display command, and a modified flight plan display command, and comparing the textual air traffic clearance message with first factors affecting aircraft safety and second factors affecting efficiency to supply an alert message display command, wherein the first factors are selected from at least one of the group consisting of terrain, traffic, and restricted airspace, and the second factors are selected from at least one of the group consisting of noise and emissions; and
   a display comprising a single screen coupled to the processor to receive the flight plan display command, the modified flight plan display command, the alert message display command and configured, in response thereto, to simultaneously display on the single screen (i) an image representative of the current aircraft flight plan, (ii) the textual air traffic clearance message, (iii) the modified flight plan, and (iv) an alert message indicating whether there are any safety or efficiency concerns related to the first factors or second factors.

2. The flight deck communication and display system of claim 1 wherein the second factors are selected from at least one of the group consisting of flight time, required time of arrival goals, and fuel burn.

3. The flight deck communication and display system of claim 1, further comprising:
   a user interface configured to receive user input and configured, in response thereto, to supply one or more flight plan modification command signals,
   wherein the processor is further coupled to the user interface to receive the flight plan modification command signals and is further configured, in response thereto, to generate one or more textual clearance messages, and to supply one or more modified flight plan display commands and one or more clearance message display commands, and
   wherein the display is further coupled to the processor to receive the flight plan modification display commands and the clearance message display commands and is further configured, in response thereto, to substantially simultaneously display (i) one or more images representative of a modified aircraft flight plan and (ii) the textual clearance messages.

4. The flight deck communication and display system of claim 1, wherein the data representative of aircraft flight plan includes navigation data, and wherein the system further comprises:
   one or more navigation databases in operable communication with the processor, each navigation database having navigation data stored therein,
   wherein the processor is further configured to selectively retrieve navigation data from each navigation database.

5. The flight deck communication and display system of claim 1, wherein:
   the processor is further configured to receive avionics data and is further configured, in response thereto, to supply one or more avionics data display commands; and
   the display is further coupled to the processor to receive the avionics data display commands and is further configured, in response thereto, to display one or more images representative of the avionics data substantially simultaneously with the current aircraft flight plan.

6. The flight deck communication and display system of claim 5 wherein the avionics data are selected from one or more of the group consisting of current position, aircraft performance constraints, altitude, heading, vertical speed, and airspeed.

7. A method of displaying a modified flight plan on a flight deck display consisting of a single screen, the method comprising:
   processing data representative of a current aircraft flight plan;
   processing a textual air traffic clearance message representative of the modified flight plan;
   comparing the textual air traffic clearance message with first factors affecting aircraft safety and second factors affecting aircraft efficiency, wherein the first factors are selected from at least one of the group consisting of terrain, traffic, and restricted airspace, and the second factors are selected from at least one of the group consisting of noise and emissions;
   substantially simultaneously displaying, on the flight deck display, an image representative of the current aircraft flight plan, an image of the modified flight plan, the air traffic clearance message and an alert indicating whether the modified flight plan impacts the at least one of aircraft safety and aircraft efficiency, the presentation of the alert being selected from the group consisting of an aural message, information displayed on the flight deck display, and a combination thereof.

8. The method of claim 7 further comprising:
   transmitting a signal to one or more air traffic control centers indicating whether the modified flight plan is accepted.

9. The method of claim 7 further comprising:
   supplying one or more modifications to the current flight plan by a pilot; and
   transmitting each of the flight plan modifications to one or more air traffic control centers as textual signals.

10. The method of claim 7 wherein the comparing step comprises comparing the textual message with the second factors selected from one or more of the group consisting of current position, aircraft performance constraints, altitude, heading, vertical speed, and airspeed.

11. The method of claim 7 wherein the comparing step comprises comparing the textual message with the second factors selected from one or more of the group consisting of flight time, required time of arrival goals, and fuel burn.

12. A flight deck communication and display system for displaying a modified flight plan, the system comprising:
   a processor on board the aircraft configured to receive a textual air traffic clearance message representative of the modified flight plan; the processor comparing the modified flight plan with factors affecting at least one of aircraft safety and efficiency, wherein the factors affecting safety are selected from one of the group consisting of terrain, traffic, and restricted airspace, and the factors affecting efficiency are selected from at least one of the group consisting of noise and emissions; and a single display coupled to the processor and configured to simultaneously display (i) a current flight plan, (ii) the modified flight plan, (iii) a modified flight plan textual description, and (iv) a textual alert message indicating whether there are any safety or efficiency concerns determined by the comparison of the modified flight plan with factors affecting at least one of aircraft safety and efficiency.

* * * * *